(12) United States Patent
Balakrishnan et al.

(10) Patent No.: US 9,949,224 B1
(45) Date of Patent: Apr. 17, 2018

(54) CONCURRENT PUBLIC LAND MOBILE NETWORK SEARCH MODE (PLMN) AND POSITIONING MODE IN A MOBILE DEVICE

(71) Applicant: QUALCOMM Incorporated, San Diego, CA (US)

(72) Inventors: Harish Balakrishnan, Chennai (IN); Hargovind Prasad Bansal, Hyderabad (IN); Ankit Maheshwari, Hyderabad (IN); Praveen Nagaraja Kona, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/468,090

(22) Filed: Mar. 23, 2017

(51) Int. Cl.
*H04W 56/00* (2009.01)
*H04J 11/00* (2006.01)
*H04W 84/04* (2009.01)

(52) U.S. Cl.
CPC ....... *H04W 56/001* (2013.01); *H04J 11/0079* (2013.01); *H04J 11/0083* (2013.01); *H04W 56/006* (2013.01); *H04W 84/042* (2013.01)

(58) Field of Classification Search
CPC ...... H04W 4/02; H04W 56/001; H04W 48/18
See application file for complete search history.

(56) References Cited

U.S. PATENT DOCUMENTS

| | | | | |
|---|---|---|---|---|
| 2011/0124335 A1* | 5/2011 | Martin | .................. | G01S 5/0205 455/434 |
| 2013/0321210 A1* | 12/2013 | Werner | ................. | G01S 5/0236 342/451 |
| 2014/0073356 A1 | 3/2014 | Siomina et al. | | |
| 2014/0204772 A1 | 7/2014 | Zhang et al. | | |
| 2014/0364079 A1* | 12/2014 | DiFazio | ................ | H04W 88/04 455/404.1 |
| 2015/0208327 A1 | 7/2015 | Baratam et al. | | |
| 2015/0341846 A1* | 11/2015 | Shi | ........................ | H04W 48/16 455/434 |
| 2016/0360374 A1* | 12/2016 | Narayanan | .............. | G01S 19/42 |

OTHER PUBLICATIONS

Gadka P., "New First—Path Detector for LTE Positioning Reference Signals", The Eighth International Conference on Mobile Ubiquitous Computing, Systems, Services and Technologies, UBICOMM 2014, pp. 99-104.

* cited by examiner

*Primary Examiner* — Myron K Wyche
(74) *Attorney, Agent, or Firm* — MG-IP Law, P.C.

(57) ABSTRACT

A method includes performing a timing measurement of one or more positioning signals received at a mobile device and searching for available public land mobile networks (PLMNs) by the mobile device. The method also includes controlling the performing the timing measurement and the searching for the available PLMNs based on whether the performing the timing measurement or the searching for the available PLMNs began first and further based on a number of available receive paths on the mobile device. If the number of available receive paths can support it, timing measurements of one or more received positioning signals may be performed concurrently with searching for available public land mobile networks (PLMNs). Otherwise, if the receive paths cannot support concurrent timing measurement and PLMN searching, the PLMN search is put on hold or suspended and the timing measurements are allowed. Upon completion, the PLMN search may then begin or resume.

30 Claims, 12 Drawing Sheets

CONCURRENT PUBLIC LAND MOBILE NETWORK SEARCH MODE (PLMN) AND POSITIONING MODE IN A MOBILE DEVICE

FIELD OF DISCLOSURE

This disclosure relates generally to mobile communications and, in particular but not exclusively, relates to an apparatus and method for management of a concurrent PLMN search and positioning of a wireless mobile device.

BACKGROUND

A Public Land Mobile Network (PLMN) is a radio access network (RAN) that provides mobile telecommunications services. The PLMN is typically a multiple-access system capable of supporting communication with multiple users by sharing the available system resources (e.g., bandwidth and transmit power). Multiple PLMNs may be operated by different operators in the same geographic area. These PLMNs may use different radio access technologies (RATs) and communication standards, such as code division multiple access (CDMA), time division multiple access (TDMA), frequency division multiple access (FDMA), 3GPP Long Term Evolution (LTE), Global System for Mobile Communications (GSM), Universal Terrestrial Radio Access (UTRA), etc.

Due to the large variety of PLMNs with often overlapping coverage areas, popularity of multimode mobile devices capable of supporting multiple RATs has grown significantly. These multimode mobile devices may have one or more radios for communication with multiple RATs. During operation, a multimode mobile device typically searches for available PLMNs and registers with one of them. The mobile device may then periodically search for a better PLMN, which may use the same or different RAT as the serving PLMN. If a better PLMN is found the mobile device may handover to the new PLMN. However, performing a PLMN search is resource intensive process that may negatively impact other wireless operations of the mobile device.

SUMMARY

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

Aspects of the present disclosure include a method, a mobile device, and a non-transitory computer-readable medium for the management of a PLMN search that is concurrent with a positioning determination of a mobile device.

For example, according to one aspect, a method includes a method includes performing a timing measurement of one or more positioning signals received at a mobile device and searching for available public land mobile networks (PLMNs) by the mobile device. The method also includes controlling the performing the timing measurement and the searching for the available PLMNs based on whether the performing the timing measurement or the searching for the available PLMNs began first and further based on a number of available receive paths on the mobile device.

According to another aspect, a mobile device includes a processor and a memory coupled to the processor. The processor and the memory are configured to direct the mobile device to perform a timing measurement of one or more positioning signals received at the mobile device and to search for available public land mobile networks (PLMNs). The processor and memory are also configured to direct the mobile device to control the performing the timing measurement and the searching for the available PLMNs based on whether the performing the timing measurement or the searching for the available PLMNs began first and further based on a number of available receive paths on the mobile device.

In yet another aspect, a mobile device includes means for performing a timing measurement of one or more positioning signals received at the mobile device and means for searching for available public land mobile networks (PLMNs) by the mobile device. The mobile device also includes means for controlling the performing the timing measurement and the searching for the available PLMNs based on whether the performing the timing measurement or the searching for the available PLMNs began first and further based on a number of available receive paths on the mobile device.

Another aspect includes a non-transitory computer-readable storage medium that includes program code stored thereon. The instructions are configured to direct a mobile device to perform a timing measurement of one or more positioning signals received at the mobile device and to search for available public land mobile networks (PLMNs). The program code further includes instructions to direct the mobile device to control the performing the timing measurement and the searching for the available PLMNs based on whether the performing the timing measurement or the searching for the available PLMNs began first and further based on a number of available receive paths on the mobile device.

Other objects and advantages associated with the aspects and embodiments disclosed herein will be apparent to those skilled in the art based on the accompanying drawings and detailed description.

BRIEF DESCRIPTION OF THE DRAWINGS

The accompanying drawings are presented to aid in the description of various example embodiments and are provided solely for illustration of the embodiments and not limitation thereof.

DETAILED DESCRIPTION

Figure 1A:
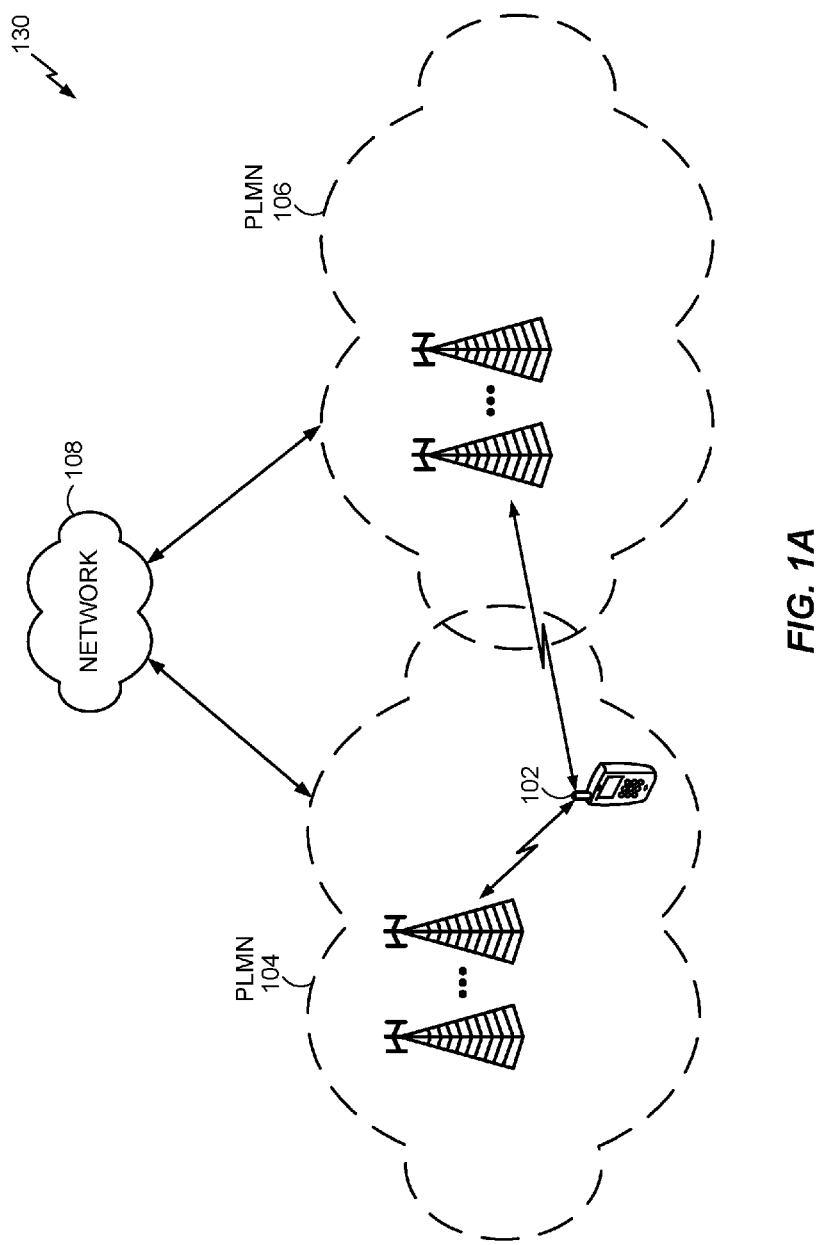
FIG. 1A is a block diagram of an example wireless communication network, in accordance with an example implementation.

Various aspects are disclosed in the following description and related drawings directed to some example embodiments. Alternate embodiments may be devised without departing from the scope of this description. Additionally, well-known elements may not be described in detail or will be omitted so as not to obscure the relevant details of example techniques presented herein.

The word "exemplary" is used herein to mean "serving as an example, instance, or illustration." Any embodiment described herein as "exemplary" is not necessarily to be construed as preferred or advantageous over other examples. Further, the interchangeable terms "example," "aspect," and "implementation" do not require that all examples, aspects, and implementations include the discussed feature, advantage, mode of operation, etc.

The terminology used herein is for the purpose of describing particular aspects only and is not intended to be limiting of present disclosure. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many examples are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer-readable storage medium having stored therein a corresponding set of computer instructions that upon execution would cause an associated processor to perform the functionality described herein. Thus, the various aspects presented herein may be embodied in a number of different forms, all of which have been contemplated to be within the scope of the claimed subject matter.

Although much of the description herein is drawn to examples in which a wireless communication system comprises a cellular communication system, it should be understood that the techniques provided herein may be applied in various manners within one or more other wireless communication systems. Thus, for example, techniques provided herein may be applied to or otherwise adapted to wireless networks having devices (e.g., access point devices, dedicated beacon transmitters, etc.) that transmit certain applicable types of beacon, pilot, and/or positioning signals from known or discoverable locations. The terms "network" and "system" may be used interchangeably herein, as well, to represent the same aspect, for example, as in a wireless communication system and a wireless communication network.

FIG. 1A illustrates one aspect of a wireless communication system 130 that includes a plurality of different Public Land Mobile Networks (PLMNs), such as PLMN 104 and PLMN 106, which provide to one or more mobile devices (such as mobile device 102) voice, data and other telecommunication services. In one aspect, PLMN 104 provides access to a network 108, such as the Internet, or to a core circuit-switched network, such as public switched telephone network (not shown). Similarly, PLMN 104 may be configured to provide access to network 108, as well as to the core circuit-switch network. Mobile device 102 may include, but not limited to, a cellular telephone, a cordless telephone, a session initiation protocol (SIP) phone, a personal digital assistant (PDA), a handheld device having wireless connection capability, a laptop computer, a tablet, a wearable computing device (e.g., watch), a vehicle, or other portable processing device having a cellular or wireless modem. Mobile device 102 may also be referred to as a subscriber unit, subscriber station, mobile station, mobile, remote station, remote terminal, access terminal, user terminal, terminal, wireless communication device, user agent, user device, user equipment (UE) or the like.

In one aspect, PLMNs 104 and 106 may use the same or different RATs, which may include but are not limited to, CDMA, TDMA, FDMA, Orthogonal Frequency-Division Multiple Access (OFDMA), SC-FDMA and other known or future technologies. For example, CDMA technology is implemented in Universal Terrestrial Radio Access (UTRA), CDMA2000 and other networks. UTRA includes Wideband- CDMA (W-CDMA) and other variants of CDMA. CDMA2000 includes 1×RTT, high rate packet data (HRPD), and evolved HRPD (eHRPD) technologies. TDMA technology is implemented in Global System for Mobile Communications (GSM). OFDMA technology is implemented in Evolved UTRA (E-UTRA), Ultra Mobile Broadband (UMB), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, CDMA2000 and UMB are described in documents from an organization named "3rd Generation Partnership Project 2" (3GPP2). Further, radio access networks may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Generally, while being within the coverage area of PLMN 104, the mobile device 102 may register with and receive telecommunication services from PLMN 104. However, as mobile device 102 moves out of the coverage area of the serving PLMN 104 and into the coverage area of PLMN 106, the mobile device 102 may handover to the PLMN 106. To that end, while being connected to the PLMN 104, the mobile device 102 may periodically search for a better PLMN by, for example, tuning to monitor pilot channels (PCH) of other PLMNs (e.g., PLMN 106) and comparing power levels of the received pilot signals with the signal strength of the serving PLMN 104 on which mobile device 102 is currently registered. Generally, if the pilot signal strength of PLMN 106 begins to exceed the signal strength of serving PLMN 104, the mobile device 102 may handover to PLMN 106. Generally, mobile device 102 may search for a better PLMN of the same or different RAT.

Different RATs provide different mechanisms for better PLMN searches. For example, 3GPP LTE systems provide two modes for better PLMN selection: (i) In automatic mode, the mobile device utilizes a prioritized list of PLMNs to choose the highest priority PLMN for handover. Automatic PLMN search may be typically performed when the mobile device is in limited service or on a roaming PLMN. (ii) In manual mode, the mobile device indicates to the user which PLMNs are available and allows the user to make a manual selection of the better PLMN. Generally, the time allocated for PLMN search (sometimes referred as a Better Public Land Mobile Network search or BPLMN search) is 150 seconds. In some aspects, the time allocated for a BPLMN search may be referred to as a guard timer. LTE Radio Resource Control (RRC) protocol may be used to controls activation of PLMN search. (See 3GPP TS 23.122 V8.2.0).

Many types of PLMNs, including 3GPP LTE systems, support Discontinuous Reception (DRX) mode of operation on the downlink (DL) channel. The mobile devices operating in the DRX mode are configured to listen for transmissions from the base stations (e.g., NodeB) on a Physical Downlink Control Channel (PDCCH) during predefined time duration, commonly referred as connected mode (or ON state), and turn off their receivers to save mobile device's battery power during a predefined periods of inactivity, commonly referred as an RRC idle mode (or OFF state), in which no downlink transmissions on PDCCH channel are scheduled. The mobile device can transition between the two modes either implicitly, based on the expiration of preconfigured timers, or explicitly, based on, e.g., the reception of a RRC protocol DRX command from the serving PLMN.

Generally, PLMN searches by mobile devices are executed in such a way that the mobile device does not miss any transmissions from the serving PLMN. Therefore, the timing of the PLMN searches is inherently linked to the DRX mode and may be directly controlled by the RRC DRX protocol command (trigger). For example, mobile devices generally initiate a manual PLMN search only when RRC has moved in the RRC idle mode. A manual PLMN search would be typically suspended as soon as RRC is moved to the connected mode, and resumed once RRC has returned to the RRC idle mode and if guard timer has not expired. However, as mentioned above, performing a PLMN search, particularly a manual PLMN search, is resource intensive process that may negatively impact other wireless operations of the mobile device. One such wireless operation that may be impacted involves position determinations that are made by a mobile device.

For example, the position of the UE may be estimated based on information gathered from various systems. One such system may include the Global Positioning System (GPS), which is one example of a satellite positioning system (SPS). SPS systems such as GPS may include a number of space vehicles (SV) orbiting the earth. Another example of a system that may provide a basis for estimating the position of the mobile device is a cellular communication system including a number of base stations to support communications for a number of mobile devices.

A position estimate, which may also be referred to as a position "fix", for a mobile device may be obtained, for example, based at least in part on distances or ranges from the mobile device to one or more transmitters, and also based at least in part on the locations of the one or more transmitters. Such transmitters may comprise SVs in the case of an SPS and/or terrestrial base stations in the case of a cellular communication system, for example. Ranges to the transmitters may be based on one or more signals transmitted by the transmitters and received at the mobile, and/or vice versa. The location of the transmitters may be ascertained, in at least some example implementations, based on the identities of the transmitters, which may be ascertained from one or more signals received from the transmitters.

In certain Code Division Multiple Access (CDMA) digital cellular networks, a position location capability may apply Advanced Forward Link Trilateration (AFLT) techniques. In certain example Wideband Code Division Multiple Access (WCDMA) and Long Term Evolution (LTE) networks a position location capability may apply Observed Time Difference Of Arrival (OTDOA) techniques.

LTE OTDOA positioning technology, by way of example, may use Positioning Reference Signals (PRS) to determine (e.g., measure, calculate, estimate, etc.) a Time Difference of Arrival (TDOA) for the positioning signals received from neighboring cells to determine an OTDOA. In order to be able to measure the PRS signals from the serving cell and neighbor cells, a mobile device, may send an assistance data request to an OTDOA system server. Such a server may then send certain assistance data, e.g., possibly indicating a suite of cells' information (e.g., Base Station Almanac (BSA) and timing information), to the mobile device. In this example, at least a portion of the information provided to the mobile device by way of such example assistance data may help the mobile device to identify which PRS(s) (cells, transceivers, etc.) to attempt to use for TOA measurements.

In some instances, an OTDOA measurement may comprise a Reference Signal Time Difference (RSTD). An RSTD may, for example, indicate a relative timing difference between two cells (e.g., a reference cell and a neighbour cell), calculated as the smallest time difference between two subframe boundaries received from the two different cells. The PRS signals may be transmitted by their respective cells on the same carrier frequency (herein, referred to intra-frequency). In other instances, the PRS signals may be transmitted on different carrier frequencies (herein, referred to as inter-frequency). Thus, an RSTD measurement may be calculated for both "intra-frequency" PRS signals and "inter-frequency" PRS signals. Such TOA-based measurements may be related to the geometric distance between an antenna of the mobile device and an antenna of the transmitting base station.

Thus, when a conventional mobile device is in the RRC Idle Mode, as discussed above, and if both a PLMN search mode and a positioning mode are triggered, the PRS data collected by the mobile device may decrease by a huge amount. In the worst case scenario, the loss in the amount of data collected can go up to ~88%. This is because as per conventional designs, the PLMN search mode is often given priority over the positioning mode whenever these two modes happen concurrently. The net result is increased uncertainties in timing measurements for position determinations and thus the reported measurements are likely to be not accurate.

For example, consider an Emergency Call Back Mode Scenario (e.g., where a mobile device is camped on limited service) and the user is in an emergency situation. In order to assist the user, the emergency operator wishes to know the location of the mobile device and sends Assistance Data to the mobile device. The mobile device then starts idle mode positioning signal measurements. Now, if the user triggers a manual PLMN search, PRS measurements may be starved in such conventional implementations.

In particular, as may be commonly implemented, a PLMN search can take up to 180 sec and a typical positioning session duration can runs up to 30 seconds. In some aspects PRS are transmitted in a pre-defined positioning subframe grouped by several consecutive subframes, which may be referred to as "positioning occasions." These positioning occasions may occur periodically with a certain periodicity (e.g., a periodicity based on a time period T_PRS). In one example, T_PRS is configured by network through index I_PRS given in Assistance Data for PRS measurements, where index I_PRS refers to a subframe index of the positioning signal used for positioning measurements. For example, an I_PRS value of 0 (zero) indicates that subframe 0 is the beginning subframe of the positioning signal used for positioning measurements. By way of another example, an I_PRS value of 2 indicates that PRS starts from subframe 2. However, if a PLMN search is triggered after the reception of Assistance Data when the mobile device is in RRC Idle mode, timing measurements of the received positioning signals do not happen with periodicity of time period T_PRS. Instead, positioning signal measurements are attempted once every paging cycle. This tremendously reduces the number of times positioning signal measurements that are attempted. In some conventional implementations T_PRS is 160 ms, where each cell in the Assistance Data should be attempted 192 times for RSTD measurements. If a manual PLMN search is triggered, the number of times a cell is attempted for RSTD measurements is reduced to ~23, assuming the default paging cycle duration of 1.28 sec. Therefore, the loss in data collected is around 88% when compared to the scenario in which there is no concurrency of a PLMN search and a positioning session.

Accordingly, aspects of the present disclosure address the above-noted issue of a PLMN search mode that is concurrent with a positioning mode at a mobile device. In one example, the execution of the PLMN search mode and the execution of the positioning mode are controlled based on which mode was entered first and based on a number of available receive paths on the mobile device. As will be discussed below, in some implementations the execution of the positioning mode is prioritized over the execution of the PLMN search mode to increase the accuracy of the timing measurements of the positioning signals gathered by the mobile device.

Figure 1B:
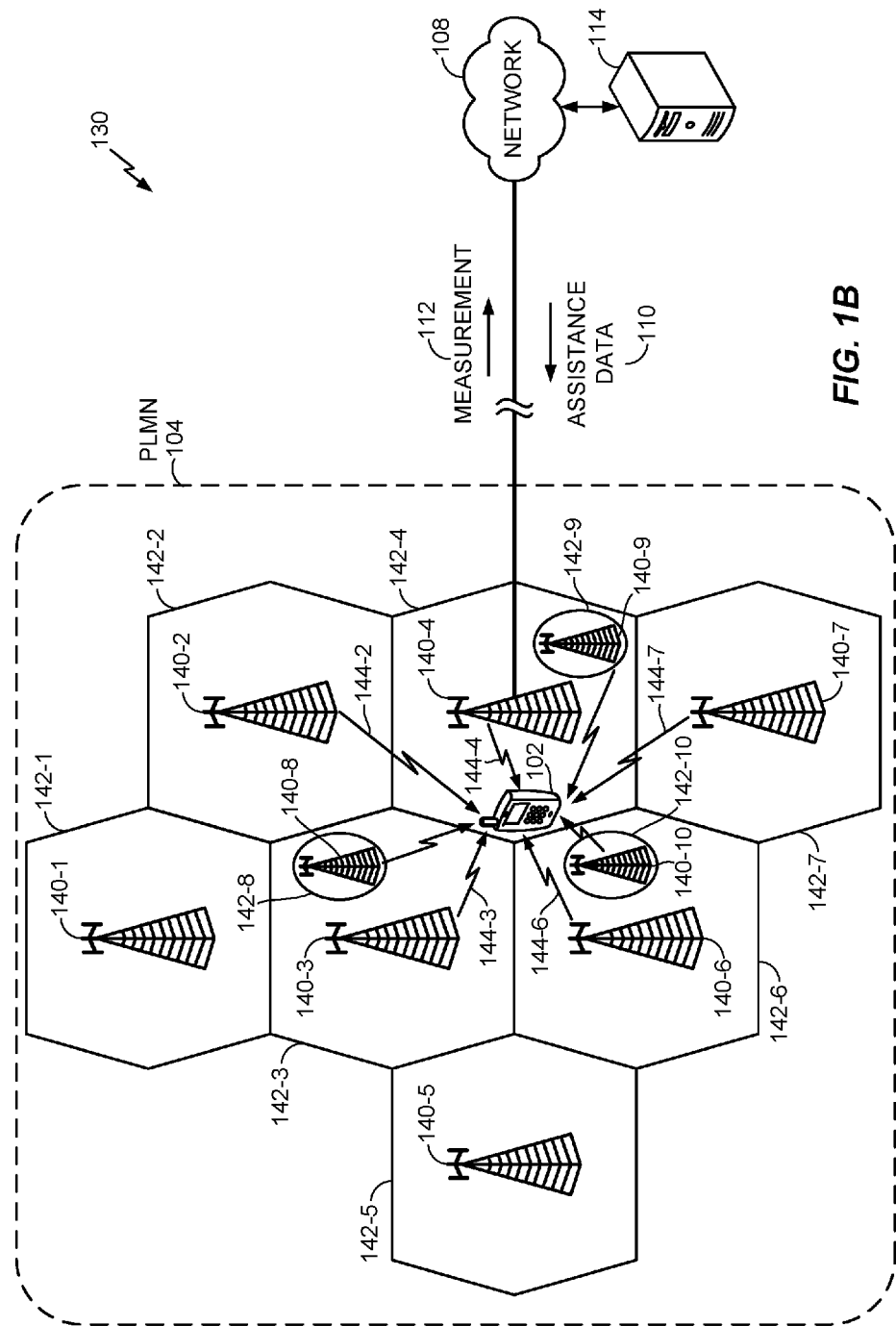
FIG. 1B is a block diagram of a portion of the example wireless communication network of FIG. 1A including additional details of a first public land mobile network (PLMN).

FIG. 1B is a block diagram of a portion of the example wireless communication system 130 of FIG. 1A including additional details of the PLMN 104. Illustrated in FIG. 1B is the PLMN 104 as including a network of cells (e.g., cells 142-1 through 142-10), network 108, a server 114 (e.g., representing all or part of one or more computing platforms), and mobile device 102. It is understood within the context of FIG. 1B that wireless communication system 130 may also include additional mobile devices other than mobile device 120. The cells (e.g., cells 142-1 through 142-10) may, for example, be configured to enable mobile device 102 to access services and devices associated with PLMN 104, possibly one or more external networks, such as the Public Switched Telephone Network (PSTN), the Internet, an intranet, etc., certain computing platform(s) or other like devices, or some combination thereof, which for the sake of this illustration may be represented, in whole or in part, by the cloud image of network 108.

Each cell (e.g., cells 142-1, 142-2, 142-3, 142-4, 142-5, 142-6, 142-7, 142-8, 142-9, and 142-10) may include at least one base station (e.g., base stations 140-1, 140-2, 140-3, 140-4, 140-5, 140-6, 140-7, 140-8, 140-9, and 140-10) or other like transceiver-configured access device. The base stations (e.g., base stations 140-1 through 140-10) may be geographically distributed across a wide geographic area served by PLMN 104. The base stations (e.g., base stations 140-1 through 140-10) may provide wireless coverage for one or more respective portions of that geographic area, referred to as cells (e.g., cells 142-1 through 142-10). Because of this, the mobile device 102 may move within or between cells (e.g., cells 142-1 through 142-10) within PLMN 104 and may communicate with one or more base stations (e.g., base stations 140-1 through 140-10) at a given position.

Different cells (e.g., cells 142-1 through 142-10) may have different nominal sizes/shapes, e.g., depending on the maximum transmit power utilized by the base stations (e.g., 140-1 through 140-10) serving those cells. For example, base station 140-1 may have a relatively large maximum transmit power and correspondingly serves mobile devices within a relatively large cell 142-1, while base station 140-8 may have a relatively small maximum transmit power and correspondingly serves mobile devices within a relatively small cell 142-8. In general, different base stations that have different pre-defined maximum transmit powers (and thereby serve cells of different nominal sizes) belong to different base station classes (e.g., a macro base station class, a micro base station class, a pico base station class, femto base station class, etc.).

Different base stations may operate on different carrier frequencies. For example, the base stations serving relatively large cells may operate on a certain carrier frequency F1 (for example, at 2 GHz), and base stations serving relatively small cells may operate on a carrier Frequency F2 (for example, at 3.5 GHz), different from carrier frequency F1. Such deployments with large cells (e.g., macro cells) and small cells (e.g., micro-, pico-, etc. cells) are often referred to as Heterogeneous Networks (HetNet). Using different carrier frequencies for the macro cell layer and small cell layer often simplifies network planning and reduces inter-cell interference. For example, it may avoid having a small cell layer interfere with a macro cell layer.

As shown in FIG. 1B, mobile device 102, at its current illustrated position, may be served by base station 140-4 in the sense that the mobile device 102 may currently be configured to exchange data with the base station 140-4 (e.g., to place calls, access various services/networks, etc). Thus, base station 140-4 may transmit data to mobile device 102 on a particular frequency (referred to as the serving cell frequency) and over a particular bandwidth (known as the serving cell bandwidth). Thus, in this example, from the perspective of mobile device 102, base station 140-4 may be referred to as the serving base station and cell 142-4 is the serving cell. Other cells that may be geographically adjacent to or partially coincident with the serving cell 142-4 may be referred to as neighboring cells. In this example, all cells shown in FIG. 1B may be neighboring cells of cell 142-4, possibly with the exception of cells 142-1 and 142-5.

Each of the cells (e.g., cells 142-1 through 142-10) (via a respective base station) may periodically transmit a positioning signal (e.g., positioning signals 144-2, 144-3, 144-4, 144-6, and 144-7). A positioning signal may, for example, comprise a predetermined signal that may be known to both a cell transmitting that signal and, possibly with the aid of assistance data provided by the server 114, by mobile device 102 receiving the signal. Exemplary positioning signals 144-2, 144-3, 144-4, 144-6, and 144-7 may be transmitted on the same or different frequencies as one another. For example, positioning signal 144-2 may be transmitted by cell 142-2 on the same carrier frequency as positioning signal 144-3 that is transmitted by cell 142-3, while positioning signal 144-4 may be transmitted on a carrier frequency that is different from the carrier frequency used to transmit 144-6. A TOA measurement on positioning signals of the same frequency is referred to herein as an intra-frequency TOA measurement, while a TOA measurement on positioning signals of differing frequencies is referred to herein as an inter-frequency TOA measurement.

In some implementations a "carrier" may be defined in accordance with 3GPP TS 36.104 as "The modulated waveform conveying the E-UTRA or UTRA physical channels". The carrier frequency may be the center frequency of the transmitted positioning signal. In each operating band, there are multiple carrier frequencies possible (dependent on the particular standard, and region of the world), and the modulated positioning signal has a certain bandwidth. In operation, the mobile device tunes its radio to the desired carrier frequency, and demodulates the positioning signal. The carrier frequencies are usually arranged such that bands do not overlap. E.g., if carrier frequency f1 uses a single-sided bandwidth of B1, then the spectrum required to transmit this signal is +/−B1, centered at f1. A separate carrier frequency f2 must then be outside of the spectrum covered by f1+/−B1, otherwise the two transmitted signals at f1 and f2 would overlap and interfere with each other. The carrier frequencies that are allowed are defined in the particular standard. The standard makes sure that the allowed carrier frequencies "make sense" (e.g., do not result in overlapping spectra, or any other restrictions).

The positioning signals (e.g., positioning signals 144-2, 144-3, 144-4, 144-6, and 144-7) transmitted by the cells in this exemplary manner may be acquired by mobile device 102 and used to determine positioning signal measurements, which may be used, at least in part, to determine a position of mobile device 102. For example, certain positioning signal measurements may be used, e.g., applied in a known multilateration technique or the like to determine a relative or other like coordinate based position location (e.g., a geographic position, etc.) of mobile device 102.

In one aspect, mobile device 102 may communicate with server 114 (e.g., possibly a location server) on network 108 for accomplishing, at least in part, such a purpose. Communication between mobile device 102 and server 114 may include, for example, one or more transactions between mobile device 102 and server 114. A transaction may pertain to a particular operation, such as the exchange of capabilities, the transfer of measurement(s) 112 (e.g., reference signal time difference (RSTD)) to server 114, the transfer of assistance data (AD) 110 from server 114 to mobile device 102 possibly for assisting mobile device 102 to perform certain positioning signal measurement(s), just to name a few examples.

Assistance data 110 may, for example, be generated or other obtained/stored by server 114 and transferred to the mobile device 102. Mobile device 102 may, in certain example implementations, attempt to determine one or more OTDOA measurements for one or more pairs of positioning signals (e.g., positioning signals 144-2, 144-3, 144-4, 144-6, and 144-7) from different cells (e.g., cells 142-1 through 142-10).

Figure 2A:
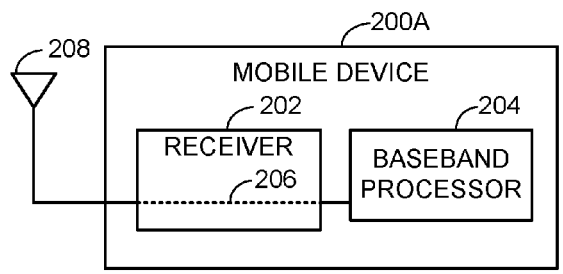
FIG. 2A is a block diagram of an example mobile device having a single receiver having a single receive path.

As mentioned above, various aspects of the present disclosure include controlling the execution of the PLMN search mode and the execution of the positioning mode based, in part, a number of available receive paths on the mobile device 102. FIGS. 2A-2D illustrate various implementations of mobile device 102 with various numbers of receivers and/or receive paths. For example, FIG. 2A is a block diagram of an example mobile device 200A having a single receiver 202, a baseband processor 204, and an antenna 208. As shown in FIG. 2A, the receiver 202 includes a single receive path 206. In operation, the receiver 202 may be tuned to a particular frequency band where single receive path 206 can only monitor/receive signals on the currently tuned frequency band.

Figure 2B:
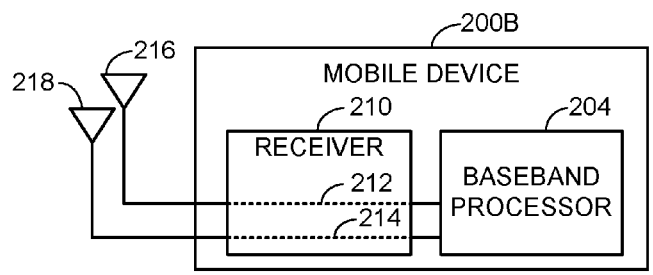
FIG. 2B is a block diagram of an example mobile device having a single receiver having multiple receive paths.

FIG. 2B is a block diagram of an example mobile device 200B having a single receiver 210 and antennas 216 and 218. As shown, receiver 210 includes multiple receive paths 212 and 214. Although FIG. 2B illustrates receiver 210 as including two receive paths, in other implementations receiver 210 may include any number of receive paths including two or more. In operation, the receiver 210 may be tuned to more than one frequency band, where receive path 212 is may monitor/receive signals on a first frequency band and wherein receiver path 214 may monitor/receive signals on a second frequency band that is the same or different from the first frequency band.

Figure 2C:
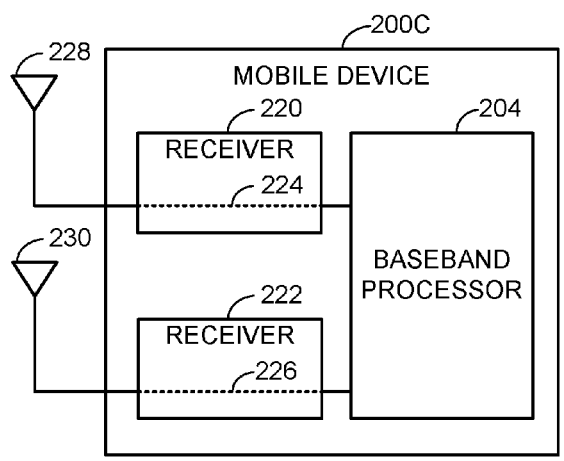
FIG. 2C is a block diagram of an example mobile device having multiple receivers where each receiver has a single respective receive path.

FIG. 2C is a block diagram of an example mobile device 200C having multiple receivers 220 and 222 as well as multiple antennas 228 and 230. As shown in FIG. 2C, each of receiver 220 and receiver 222 has a single receive path 224 and 226, respectively. Although FIG. 2C illustrates mobile device 200C as including two receivers, in other implementations mobile device 200C may include any number of receivers including two or more. In operation, the receiver 220 may be tuned to a first frequency band where receive path 224 can only monitor/receive signals on the first frequency band. Similarly, receiver 222 may be tuned to a second frequency band where the receive path 226 can only monitor/receive signals on the second frequency band.

Figure 2D:
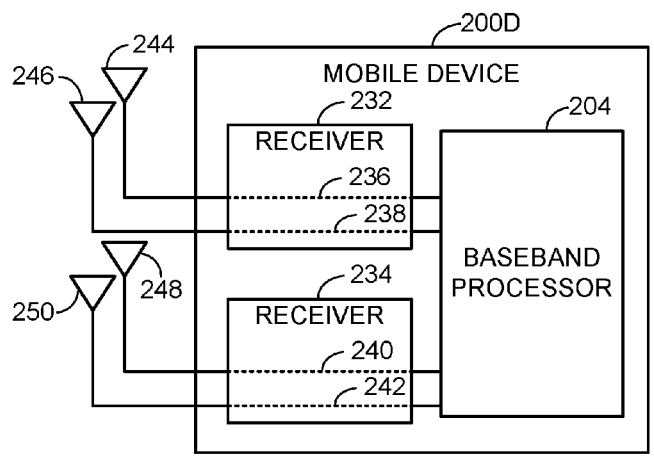
FIG. 2D is a block diagram of an example mobile device having multiple receivers where each receiver has multiple receive paths.

FIG. 2D is a block diagram of an example mobile device 200D having multiple receivers 232 and 234, as well as multiple antennas 244, 246, 248, and 250. As shown, receiver 232 includes multiple receive paths 236 and 238. Similarly, receiver 234 includes multiple receive paths 240 and 242. Although FIG. 2D illustrates mobile device 200D as including two receivers, in other implementations mobile device 200D may include any number of receivers including two or more. Furthermore, although FIG. 2D illustrates receivers 232 and 234 as each including two receive paths, in other implementations one or more of the receivers 232 and 234 may include any number of receive paths including two or more. In operation, the receiver 232 may be tuned to more than one frequency band, where receive path 236 is may monitor/receive signals on a first frequency band and wherein receiver path 238 may monitor/receive signals on a second frequency band that is the same or different from the first frequency band. Similarly, the receiver 234 may be tuned to more than one frequency band, where receive path 240 is may monitor/receive signals on a third frequency band and wherein receive path 242 may monitor/receive signals on a fourth frequency band that is the same or different from the third frequency band.

Figure 3A:
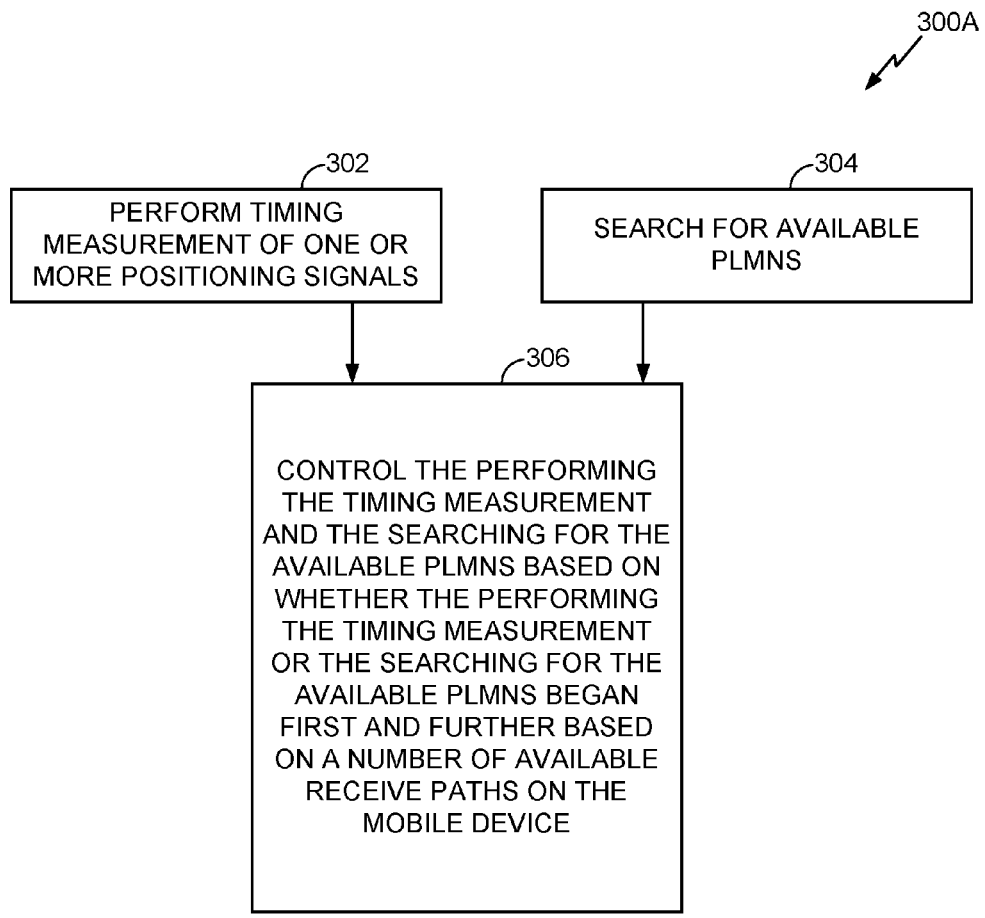
FIG. 3A is a flowchart illustrating an example process, by a mobile device, of controlling performing a timing measurement and searching for available PLMNs.

FIG. 3A is a flowchart illustrating an example process 300A, by a mobile device, of controlling the performing of a timing measurement and the searching for available PLMNs. Process 300A may be performed by mobile device 102 of FIGS. 1A and 1B, or any of the mobile devices 200A-200D of FIGS. 2A-2D. Various implementations of these mobile devices can include a processor and a memory coupled to the processor, wherein the processor and the memory are configured to direct the mobile device to perform a timing measurement of one or more positioning signals received at the mobile device, search for available public land mobile networks (PLMNs) by the mobile device, and control the performing the timing measurement and the searching for the available PLMNs based on whether the performing the timing measurement or the searching for the available PLMNs began first and further based on a number of available receive paths on the mobile device, as will be explained with reference to blocks 302, 304, and 306, below.

Process block 302 includes the mobile device 102 performing a timing measurement of one or more positioning signals. In one aspect, the mobile device 102 may begin the timing measurement in response to the mobile device 102 receiving assistance data (e.g., AD 110 of FIG. 1B) from a location server, such as server 114. Process block 304 includes the mobile device searching for available PLMNs. The mobile device 102 may begin searching for available PLMNs in response to a user triggering a manual PLMN search. In a process block 306, the mobile device 102 controls the performing the timing measurement (e.g., process block 302) and the searching for available PLMNs (e.g., process block 304) based on whether the performing the timing measurement or the searching for available PLMNs began first (e.g., whether process block 302 or process block 304 began first). The mobile device 102 further controls the performing the timing measurement and the searching for available PLMNs based on a number of available receive paths on the mobile device 102. In one aspect, the number of available receive paths depends on the number of receivers and/or the number of receive paths included in each according to the various configurations as discussed above with reference to FIGS. 2A-2D. As will be discussed in more detail below, controlling the performing of the timing measurement and of the searching for available PLMNs may include prioritizing the timing measurement over the searching for available PLMNs when the mobile device 102 includes only a single receive path. Also, aspects of the present disclosure may concurrently perform the timing measurement and the search for available PLMNs if the mobile device 102 is configured to include multiple receive paths. Furthermore, aspects of the present disclosure may include the mobile device 102 only prioritizing the timing measurement over the search for available PLMNs when the mobile device 102 is in the RRC idle mode.

Figure 3B:
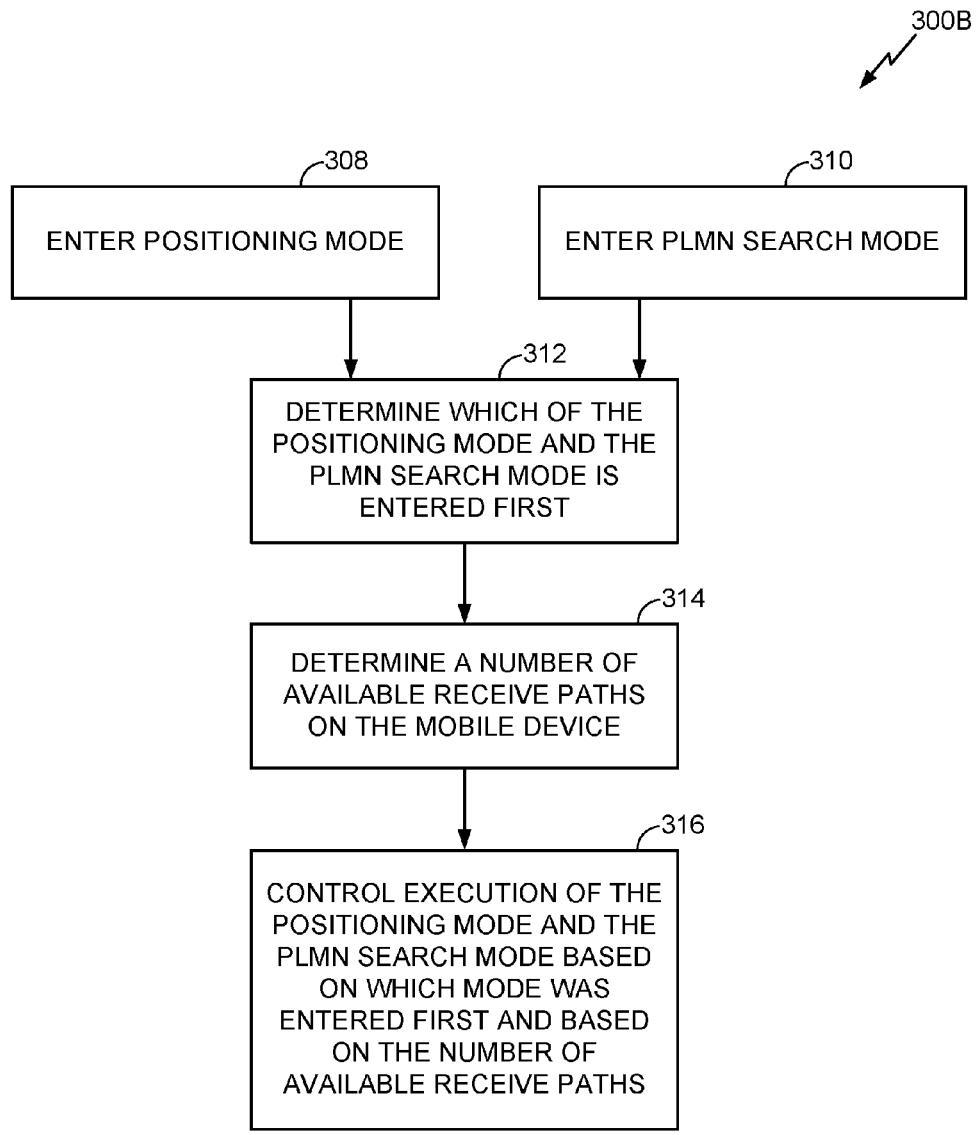
FIG. 3B is a flowchart illustrating an example process, by a mobile device, of controlling the execution of a positioning mode and a PLMN search mode.

FIG. 3B is a flowchart illustrating an example process 300B, by a mobile device, of controlling the execution of a positioning mode and a PLMN search mode. Process 300B is one possible implementation of process 300A of FIG. 3A and may be performed by mobile device 102 of FIGS. 1A and 1B, or any of the mobile devices 200A-200D of FIGS. 2A-2D.

In a process block 308 the mobile device 102 enters the positioning mode and in process block 310, the mobile device 102 enters the PLMN search mode. As discussed above, the positioning mode may be entered in response to the mobile device 102 receiving assistance data (e.g., AD 110 of FIG. 1B) from a location server, such as server 114. Furthermore, the PLMN search mode may be entered in response to a user triggering a manual PLMN search. In a process block 312, the mobile device 102 determines which of the positioning mode and the PLMN search mode is entered first. In one example, the positioning mode is determined to have been entered first if execution of the positioning mode has already begun (e.g., mobile device 102 has already begun monitoring for and/or performing timing measurements on one or more positioning signals received at the mobile device 102). Similarly, the PLMN search mode is determined to have been entered first if execution of the PLMN search mode has already begun (e.g., mobile device 102 has begun searching for available PLMNs via a receive path of the mobile device 102).

In a process block 314, the mobile device 102 determines a number of available receive paths on the mobile device 102. In one aspect, the number of available receive paths depends on the number of receivers and/or the number of receive paths included in each according to the various configurations as discussed above with reference to FIGS. 2A-2D. For example, if mobile device 102 includes a single receiver having a single receive path, such as shown in the example of FIG. 2A, then the mobile device 102 may determine that the mobile device includes no more than one available receive path. Similarly, if the mobile device 102 includes the single receiver having a single receive path of FIG. 2A, but the receive path is currently being utilized by one of the two modes (i.e., PLMN search mode or positioning mode), then the mobile device 102 may determine that there are no available receive paths other than the receive path currently being utilized by one of the two modes. If however, the mobile device 102 includes any of the configurations of FIGS. 2B-2D, the determination in process block 308 may include a determination that there are one or more available receive paths even if one of the two modes is already utilizing a receive path. For example, assuming the mobile device 102 includes a single receiver having multiple receive paths 212 and 214, such as shown in FIG. 2B, where receive path 212 is currently being utilized by the positioning mode, then the mobile device 102 may determine that there is indeed an available receive path (i.e., receive path 214).

Next, in process block 316, the mobile device 102 controls the execution of the positioning mode and the PLMN search mode based on which mode was entered first (i.e., process block 312) and based on the number of available receive paths on the mobile device (i.e., process block 314). As will be discussed in more detail below, aspects of the present disclosure may include prioritizing execution of the positioning mode over the PLMN search mode when the mobile device 102 includes only a single receive path. Also, aspects of the present disclosure may allow for the concurrent execution of the positioning mode and the PLMN search mode if the mobile device 102 is configured to include multiple receive paths. Furthermore, aspects of the present disclosure may include the mobile device 102 only prioritizing execution of the positioning mode over execution of the PLMN search mode when the mobile device 102 is in the RRC idle mode.

Figure 4:
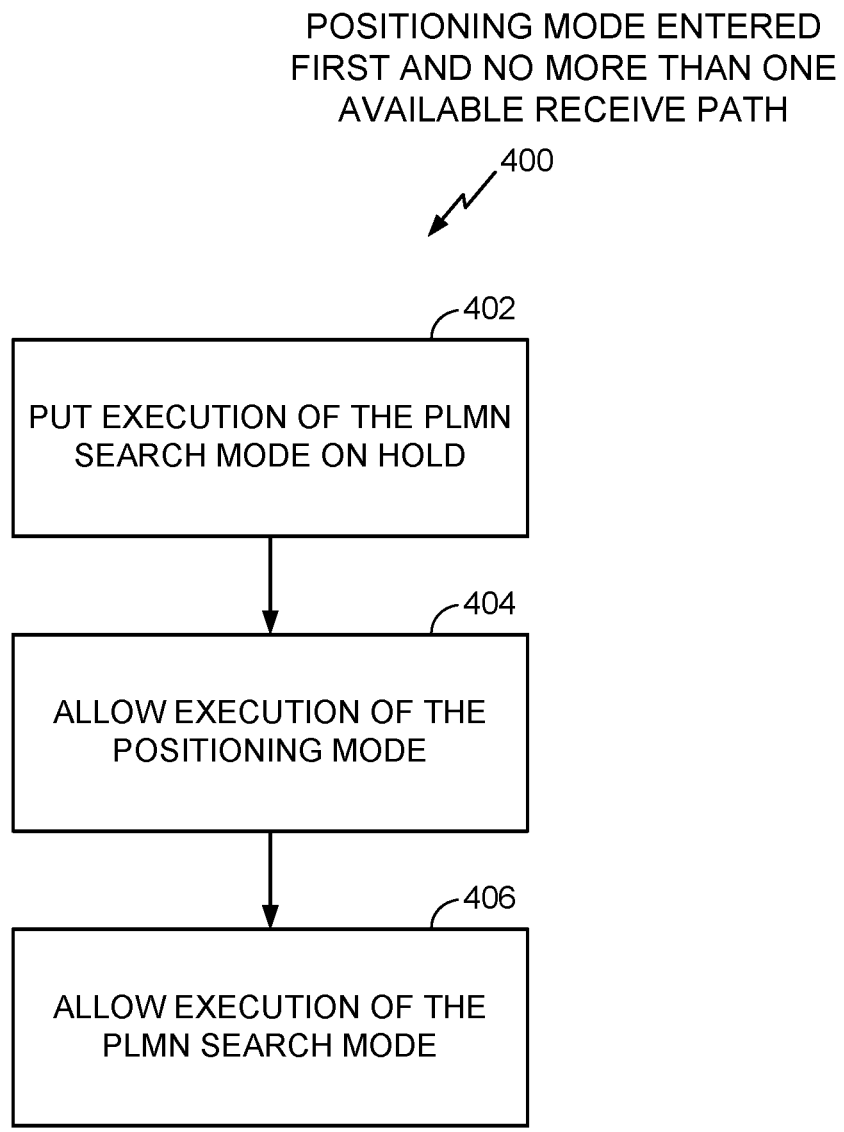
FIG. 4 is a flowchart illustrating an example process, by a mobile device, of controlling the execution of a positioning mode and a PLMN search mode when it is determined that the positioning mode is entered first and that the mobile device includes no more than one available receive path.

FIG. 4 is a flowchart illustrating an example process 400, by a mobile device 102, of controlling the execution of a positioning mode and a PLMN search mode when it is determined that the positioning mode is entered first and that the mobile device includes no more than one available receive path. Process 400 is one possible implementation of process block 316 of FIG. 3B.

The illustrated example of process 400 includes the scenario where the mobile device 102 is configured to include a single receive path (e.g., see FIG. 2A) and where the positioning mode had been entered first. As mentioned above, the positioning mode may be entered in response to the mobile device 102 receiving assistance data from a location server. After the positioning mode is entered, the PLMN search mode is entered in response to, for example, the user of the mobile device 102 initiating a manual PLMN search. If so, the process 400 includes a process block 402 where the mobile device 102 puts the execution of the PLMN search mode on hold. In one example, putting the execution of the PLMN search mode on hold includes delaying or otherwise preventing the mobile device 102 from searching for available PLMNs before the searching for available PLMNs has begun.

In a process block 404, the mobile device allows the execution of the positioning mode. In one example, allowing the execution of the positioning mode includes enabling or otherwise continuing to allow the mobile device 102 to perform timing measurements of one or more positioning signals. As discussed above, the identity and relevant information regarding which positioning signals to perform timing measurements with may be included in the assistance data received at the mobile device 102. Performing a timing measurement may include the mobile device 102 estimating a time difference of arrival (TDOA) of one or more positioning signals (e.g., PRS signals). In one aspect, execution of the positioning mode may be determined to be complete once all of the positioning signals identified in the assistance data have been measured a threshold number of times or if a maximum amount of time allocated for the measurements has expired.

In response to completion of the positioning mode, process 400 proceeds to process block 406 where the PLMN search mode is now allowed to execute after having been on hold. In one example, process block 406 includes tuning a receive path of the mobile device 102 from a frequency band associated with the positioning signals to one or more frequency bands associated with a PLMN search.

Figure 5:
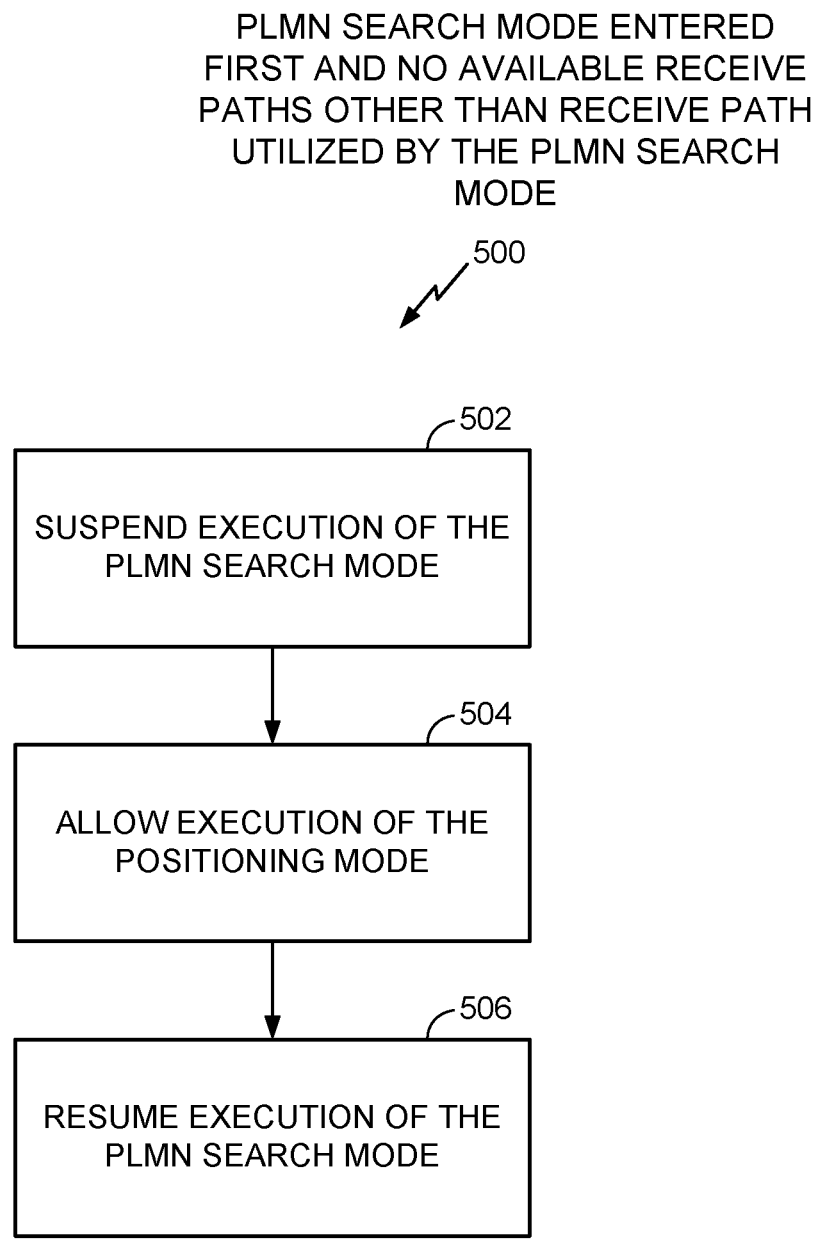
FIG. 5 is a flowchart illustrating an example process, by a mobile device, of controlling the execution of a positioning mode and a PLMN search mode when it is determined that the PLMN search mode is entered first and that the mobile device includes no available receive paths other than a receive path utilized by the PLMN search mode.

FIG. 5 is a flowchart illustrating an example process 500, by a mobile device (e.g., mobile device 102), of controlling the execution of a positioning mode and a PLMN search mode when it is determined that the PLMN search mode is entered first and that the mobile device includes no available receive paths other than a receive path utilized by the PLMN search mode. Process 500 is one possible implementation of process block 316 of FIG. 3B.

The illustrated example of process 500 includes the scenario where the mobile device 102 is configured to include a single receive path (e.g., see FIG. 2A) and where the PLMN search mode had been entered first. As mentioned above, the PLMN search mode may be entered in response to, for example, the user of the mobile device 102 initiating a manual PLMN search. The positioning mode may be subsequently entered in response to the mobile device 102 receiving assistance data from a location server. If so, the process 500 includes a process block 502 where the mobile device 102 suspends the execution of the PLMN search mode. In one example, suspending the execution of the PLMN search mode includes delaying or otherwise preventing the mobile device 102 from any further searching of available PLMNs. In one example, since the PLMN search mode was entered first, a PLMN search may have already begun when positioning measurements are then to be made. Execution of the PLMN search mode may include the mobile device 102 scanning several frequency bands and listening for relevant pilot signals. If so, suspending the execution of the PLMN search mode may include saving a partial result of the frequency bands searched thus far.

In a process block 504, the mobile device allows the execution of the positioning mode. In one example, allowing the execution of the positioning mode includes enabling the mobile device 102 to perform timing measurements of one or more positioning signals. As discussed above, the identity and relevant information regarding which positioning signals to perform timing measurements with may be included in the assistance data received at the mobile device 102.

As mentioned above, since the PLMN search mode was entered first, execution of the PLMN search mode may have already begun. Thus, allowing the execution of the positioning mode in process block 504 may include tuning a receiver of the mobile device 102 from a frequency band associated with the PLMN search to a frequency band associated with the positioning signals.

In response to completion of the positioning mode, process 500 proceeds to process block 506 where the PLMN search mode is now allowed to resume after having been suspended. In one example, process block 506 includes tuning a receive path of the mobile device 102 from a frequency band associated with the positioning signals to one or more frequency bands associated with a PLMN search. In one aspect, resuming the PLMN search mode may include searching the next frequency band subsequent to the last frequency band searched immediately before the PLMN search mode was suspending in process block 502.

Figure 6:
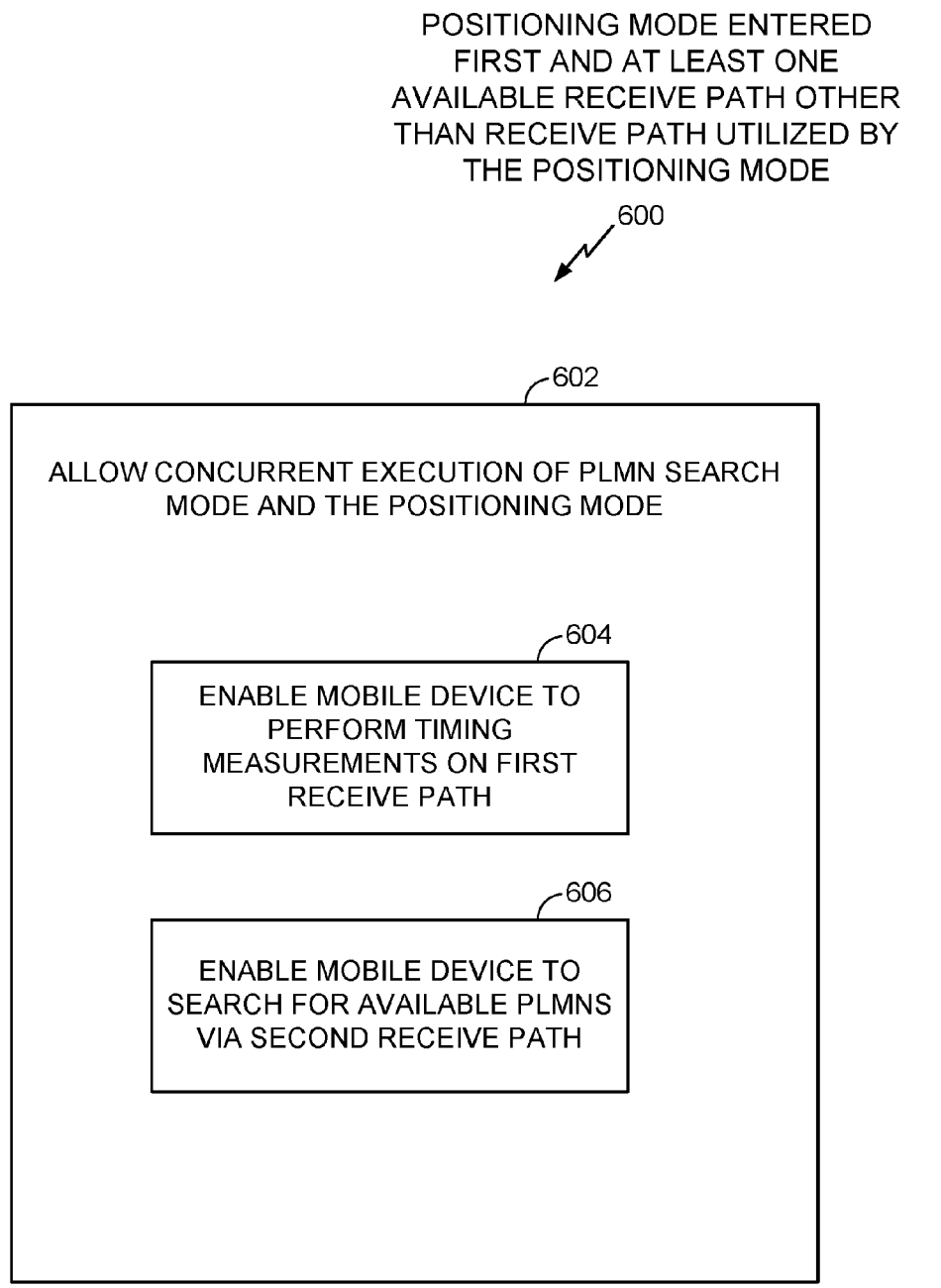
FIG. 6 is a flowchart illustrating an example process, by a mobile device, of allowing the concurrent execution of a positioning mode and a PLMN search mode when it is determined that the positioning mode is entered first and that the mobile device includes at least one available receive path other than a receive path utilized by the positioning mode.

FIG. 6 is a flowchart illustrating an example process 600, by a mobile device 102, of allowing the concurrent execution of a positioning mode and a PLMN search mode when it is determined that the positioning mode is entered first and that the mobile device includes at least one available receive path other than a receive path utilized by the positioning mode. Process 600 is one possible implementation of process block 316 of FIG. 3B.

The illustrated example of process 600 includes the scenario where the mobile device 102 is configured to include a multiple receive paths (e.g., see FIGS. 2B-2D) and where the positioning mode has been entered first. If so, process block 602 includes allowing the concurrent execution of the PLMN search mode and the positioning mode. As shown in FIG. 6, allowing the concurrent execution of the two modes includes process block 604 and 606. In particular, process block 604 include enabling or otherwise allowing the mobile device 102 to continue performing timing measurements received via a first receive path (e.g., receive path 224 of FIG. 2C), whereas process block 606 includes enabling or otherwise scheduling the mobile device 102 to concurrently search of available PLMNs via a second receive path (e.g., receive path 226 of FIG. 2C).

Figure 7:
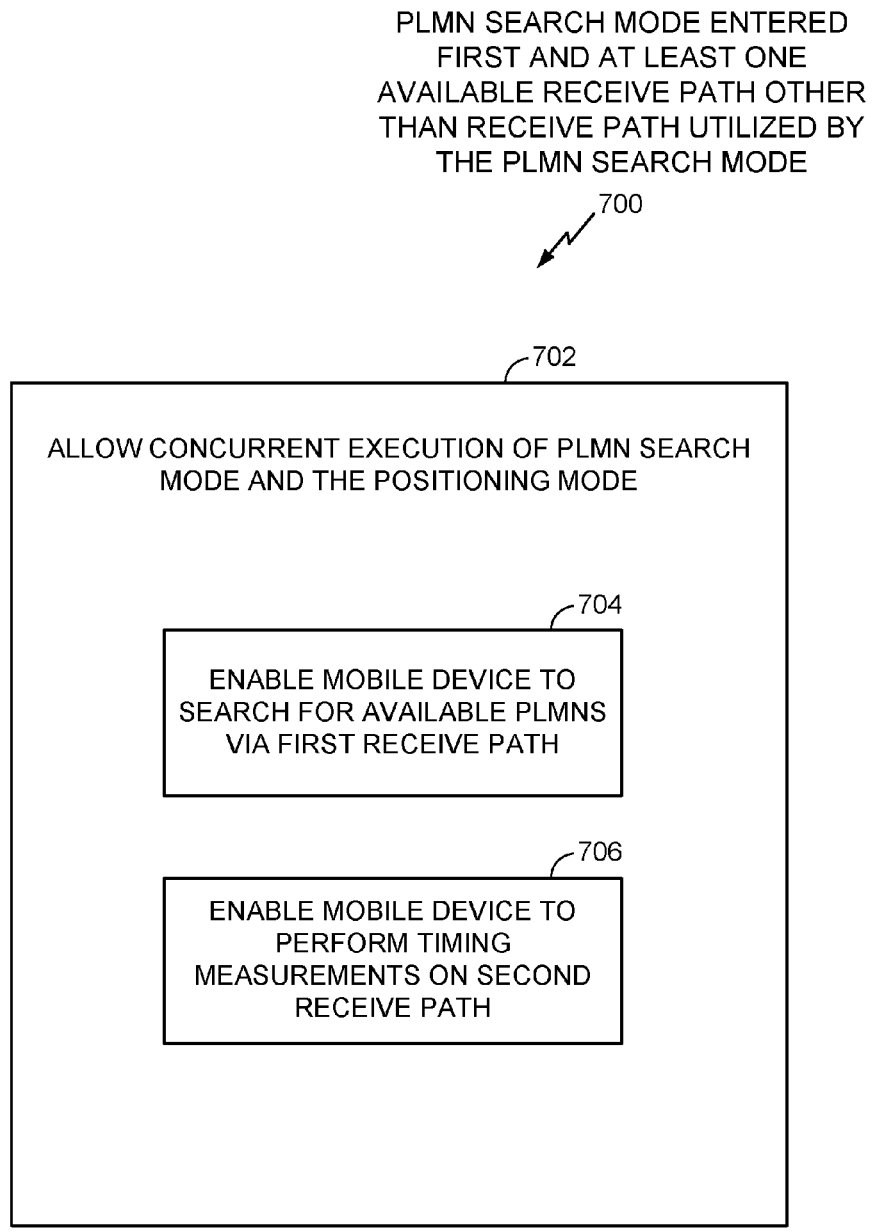
FIG. 7 is a flowchart illustrating an example process, by a mobile device, of allowing the concurrent execution of a positioning mode and a PLMN search mode when it is determined that the PLMN search mode is entered first and that the mobile device includes at least one available receive path other than a receive path utilized by the PLMN search mode.

FIG. 7 is a flowchart illustrating an example process, by a mobile device, of allowing the concurrent execution of a positioning mode and a PLMN search mode when it is determined that the PLMN search mode is entered first and that the mobile device includes at least one available receive path other than a receive path utilized by the PLMN search mode. Process 700 is one possible implementation of process block 316 of FIG. 3B.

The illustrated example of process 700 includes the scenario where the mobile device 102 is configured to include a multiple receive paths (e.g., see FIGS. 2B-2D) and where the PLMN search mode has been entered first. If so, process block 702 includes allowing the concurrent execution of the PLMN search mode and the positioning mode. As shown in FIG. 7, allowing the concurrent execution of the two modes includes process blocks 704 and 706. In particular, process block 704 include enabling or otherwise allowing the mobile device 102 to continue searching for available PLMNs via a first receive path (e.g., receive path 224 of FIG. 2C), whereas process block 706 includes enabling or otherwise scheduling the mobile device 102 to concurrently perform timing measurements of positioning signals received via a second receive path (e.g., receive path 226 of FIG. 2C).

Figure 8:
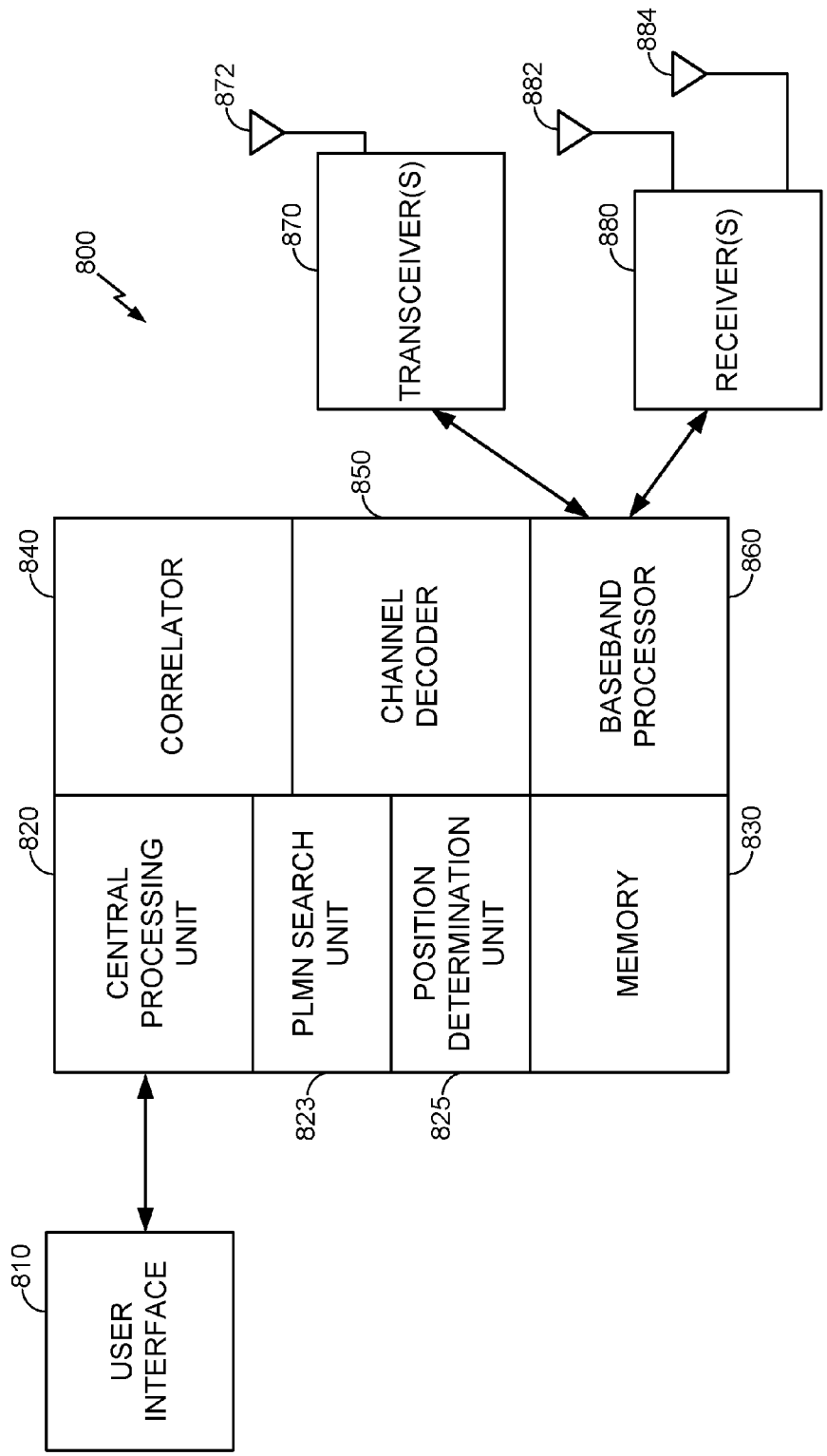
FIG. 8 is a block diagram showing certain features of an example mobile device, in accordance with an example implementation.

FIG. 8 is a block diagram showing certain features of an example mobile device 800, in accordance with an example implementation. Additionally, mobile device 800 is one possible implementation of mobile device 102 of FIG. 1, mobile devices 200A-D of FIGS. 2A-2D, or mobile device 900 of FIG. 9 (discussed below).

Transceiver(s) 870 may be configured to modulate a radio frequency (RF) carrier signal with baseband information, such as voice or data, onto an RF carrier, and demodulate a modulated RF carrier to obtain such baseband information. An antenna 872 may be configured to transmit a modulated RF carrier over a wireless communication link and receive a modulated RF carrier over a wireless communication link. In one embodiment, antenna 872 may be configured to transmit cellular timing information and/or assistance data requests to a base station (e.g., base station 140-4 of FIG. 1B) and receive assistance data from a base station.

A baseband processor 860 may be configured to provide baseband information from a central processing unit (CPU) 820 to the transceiver(s) 870 for transmission over a wireless communication link. Here, the CPU 820 may obtain such baseband information from an input device within a user interface 810. The baseband processor 860 may also be configured to provide baseband information from the transceiver(s) 870 to the CPU 820 for transmission through an output device within the user interface 810.

The user interface 810 may comprise one or more devices for inputting or outputting user information such as voice or data. Such devices may include, by way of non-limiting examples, a keyboard, a display screen, a microphone, and a speaker.

Receiver(s) 880 may be configured to receive and demodulate transmissions from an SPS via one or more antennas 882 and 884. The receiver(s) 880 may be configured to include one or more receive paths such as shown in the examples provided in FIGS. 2A-2D, or any combination thereof. Receiver(s) 880 is further configured to provide demodulated information to correlator 840. Correlator 840 may be configured to derive correlation functions from the information provided by receiver(s) 880. Correlator 840 may be configured to derive pilot-related correlation functions from information relating to pilot signals provided by the transceiver(s) 870. This information may be used by the mobile device to acquire wireless communication services. A channel decoder 850 may be configured to decode channel symbols received from baseband processor 860 into underlying source bits. In one example, where channel symbols comprise convolutionally encoded symbols, channel decoder 850 may comprise a Viterbi decoder. In a second example, where channel symbols comprise serial or parallel concatenations of convolutional codes, channel decoder 850 may comprise a turbo decoder.

A memory 830 may be configured to store machine-readable instructions which are executable to perform one or more of processes, implementations, or examples thereof which are described or suggested herein. The CPU 820 and/or the baseband processor 860 may be configured to access and execute such machine-readable instructions.

Mobile device 800 may include a PLMN search unit 823 that is configured to perform operations related to the PLMN search mode as discussed above. In one example, PLMN search unit 823 is configured to tune the receiver(s) 880 to one or more frequency bands associated with a PLMN search and to monitor and save the results of any pilot signals received during the PLMN search. In another example, PLMN search unit 823 may cause the mobile device 800 to enter the PLMN search mode in response to user input received via user interface 810.

Mobile device 800 may also include a position determination unit 825 that may be configured to perform positioning signal measurements and/or assistance data processing. In one example, the position determination unit 825 may be configured to generate assistance data requests and to initiate transmission of such request(s) to a base station via the transceiver(s) 870. In another example, position determination unit 825 may process assistance data received via transceiver(s) 870. PLMN search unit 823, position determination unit 825, and the baseband processor 860 are illustrated separately for clarity, but may be a single unit. Indeed, it should be clear that, in certain implementations, all or part of one or more of the example features illustrated in FIG. 8 may be combined or otherwise share common components, etc.

The CPU 820, as well as one or more of the PLMN search unit, the position determination unit 825, correlator 840, channel decoder 850, and baseband processor 860 can, but need not necessarily include, one or more microprocessors, embedded processors, controllers, application specific integrated circuits (ASICs), advanced digital signal processors (ADSPs), and the like. The term processor describes the functions implemented by the system rather than specific hardware. Moreover, as used herein the term "memory" refers to any type of computer storage medium, including long term, short term, or other memory associated with mobile device 800, and is not to be limited to any particular type of memory or number of memories, or type of media upon which memory is stored.

Figure 9A:
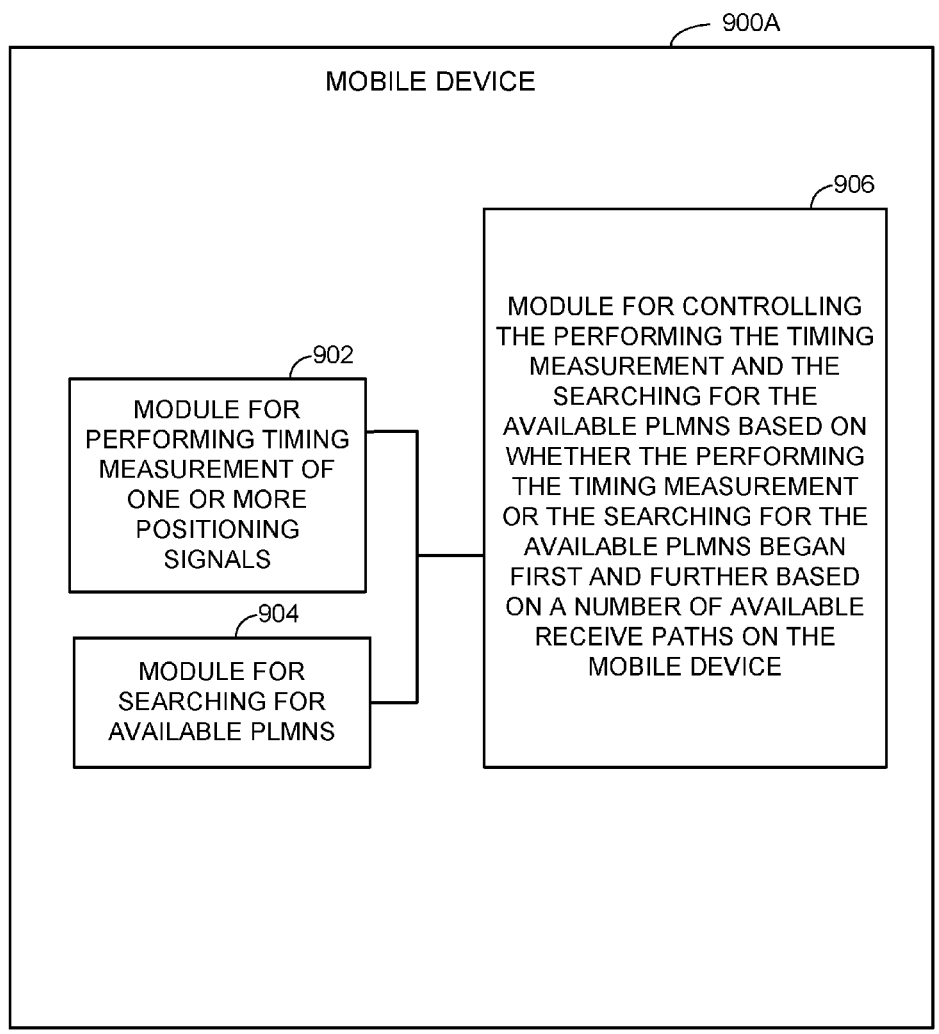
FIG. 9A illustrates several sample aspects of components that may be employed in a mobile device configured to control performing a timing measurement and the searching for available PLMNS, according to aspects of the disclosure.

FIG. 9A illustrates several sample aspects of components that may be employed in a mobile device configured to control performing a timing measurement and the searching for available PLMNS, according to aspects of the disclosure. Mobile device 900A is one possible implementation of mobile device 102 of FIGS. 1A and 1B, mobile device 200A of FIG. 2A, mobile device 200B of FIG. 2B, mobile device 200C of FIG. 2C, mobile device 200D of FIG. 2D, and/or mobile device 800 of FIG. 8.

A module 902 for performing a timing measurement of one or more positioning signals may correspond at least in some aspects to, for example, CPU 820, position determination unit 825, memory 830, baseband processor 860, and/or receiver(s) 880. A module 904 for searching for available PLMNs may correspond at least in some aspects to, for example, user interface 810, CPU 820, PLMN search unit 823, memory 830, baseband processor 860, and/or receiver(s) 880. A module 906 for controlling the performing of the timing measurement and of the searching for available PLMNs may correspond at least in some aspects to, for example, CPU 820, PLMN search unit 823, position determination unit 825, memory 830, and/or baseband processor 860.

Figure 9B:
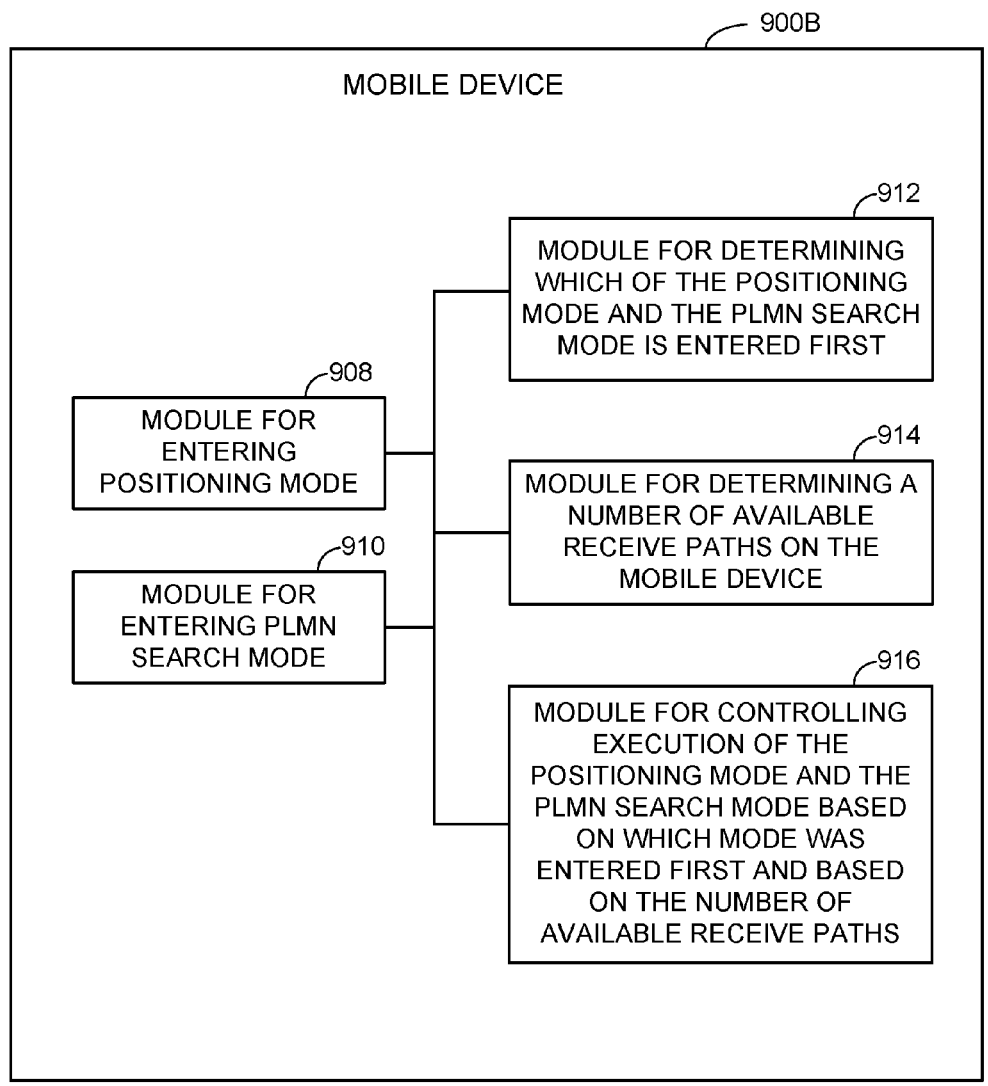
FIG. 9B illustrates several sample aspects of components that may be employed in a mobile device configured to control execution of a PLMN search mode and a positioning mode, according to aspects of the disclosure.

FIG. 9B illustrates several sample aspects of components that may be employed in a mobile device 900B configured to control execution of a PLMN search mode and a positioning mode, according to aspects of the disclosure. Mobile device 900B is one possible implementation of mobile device 102 of FIGS. 1A and 1B, mobile device 200A of FIG. 2A, mobile device 200B of FIG. 2B, mobile device 200C of FIG. 2C, mobile device 200D of FIG. 2D, mobile device 800 of FIG. 8, and/or mobile device 900A of FIG. 9A.

A module 908 for entering a positioning mode may correspond at least in some aspects to, for example, CPU 820, position determination unit 825, memory 830, baseband processor 860, and/or receiver(s) 880. A module 910 for entering a PLMN search mode may correspond at least in some aspects to, for example, user interface 810, CPU 820, PLMN search unit 823, memory 830, baseband processor 860, and/or receiver(s) 880. A module 912 for determining which of the positioning mode and the PLMN search mode is entered first may correspond at least in some aspects to, for example, CPU 820, memory 830, and/or baseband processor 860. A module 914 for determining a number of available receive paths on the mobile device may correspond at least in some aspects to, for example, CPU 820, memory 830, and/or baseband processor 860. A module 916 for controlling the execution of the positioning mode and the PLMN search mode based on which mode was entered first and based on the number of available receive paths may correspond at least in some aspects to, for example, CPU 820, PLMN search unit 823, position determination unit 825, memory 830, and/or baseband processor 860.

The functionality of the modules 902-916 of FIGS. 9A and 9B may be implemented in various ways consistent with the teachings herein. In some designs, the functionality of modules 902-916 may be implemented as one or more electrical components. In some designs, the functionality of modules 902-916 may be implemented as a processing system including one or more processor components. In some designs, the functionality of modules 902-916 may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIGS. 9A and 9B, as well as other components and functions described herein, may be implemented using any suitable means. Such means also may be implemented, at least in part, using corresponding structure as taught herein. For example, the components described above in conjunction with the "module for" components of FIGS. 9A and 9B also may correspond to similarly designated "means for" functionality. Thus, in some aspects, one or more of such means may be implemented using one or more of processor components, integrated circuits, or other suitable structure as taught herein.

The methods, sequences and/or algorithms described in connection with the embodiments disclosed herein may be embodied directly in hardware, in a software module executed by a processor, or in a combination of the two. A software module may reside in Random Access Memory (RAM) memory, flash memory, Read Only Memory (ROM) memory, Erasable Programmable Read Only Memory (EPROM) memory, Electrically Erasable Programmable Read Only Memory (EEPROM) memory, registers, hard disk, a removable disk, a Compact Disc Read Only Memory (CD-ROM), or any other form of storage medium known in the art. An exemplary storage medium is coupled to the processor such that the processor can read information from, and write information to, the storage medium. In the alternative, the storage medium may be integral to the processor.

Accordingly, aspects of the present disclosure can include a non-transitory computer readable storage medium embodying a method for controlling execution of the PLMN search mode and a positioning mode in a mobile device, as discussed above. For example, the non-transitory computer-readable storage medium can include program code stored thereon where the program code comprises instructions for instructing a mobile device to perform any of the processes described in FIGS. 3A, 3B, 4, 5, 6, and/or 7. Accordingly, the invention is not limited to illustrated examples and any means for performing the functionality described herein are included in embodiments of the invention. Furthermore, aspects of the present disclosure can include means for performing blocks 302, 304, and 306 of FIG. 3A. In some aspects, means for performing block 302 can include, for example, CPU 820, position determination unit 825, memory 830, baseband processor 860, and/or receiver(s) 880 of FIG. 8. In some aspects, means for performing block 304 can include, for example, user interface 810, CPU 820, PLMN search unit 823, memory 830, baseband processor 860, and/or receiver(s) 880 of FIG. 8. In some aspects, means for performing block 306 can include, for example, CPU 820, PLMN search unit 823, position determination unit 825, memory 830, and/or baseband processor 860 of FIG. 8. Additional aspects of the present disclosure can include means for putting, means for suspending, means for tuning, means for resuming, and means for concurrently performing. By way of example, the means for putting, means for suspending, means for tuning, means for resuming, and means for concurrently performing may correspond to one or more of the components included in mobile device 800 of FIG. 8, including, but not limited to CPU 820, PLMN search unit 823, position determination unit 825, memory 830, and/or baseband processor 860.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware, firmware, or software in combination with hardware and/or firmware depends upon the particular application and design constraints imposed on the overall system. Skilled artisans may implement the described functionality in varying ways for each particular application, but such implementation decisions should not be interpreted as causing a departure from the scope of the present description.

While the foregoing disclosure shows illustrative examples, it should be noted that various changes and modifications could be made herein without departing from the scope of the currently claimed subject matter. The functions, steps and/or actions of the method claims in accordance with the examples described herein need not be performed in any particular order. Furthermore, although elements may be described or claimed in the singular, the plural is contemplated unless limitation to the singular is explicitly stated.

What is claimed is:

1. A method for use in a mobile device, the method comprising:
    performing a timing measurement of one or more positioning signals received at the mobile device;
    searching for available public land mobile networks (PLMNs) by the mobile device; and
    controlling the performing the timing measurement and the searching for the available PLMNs based on whether the performing the timing measurement or the searching for the available PLMNs began first and further based on a number of available receive paths on the mobile device.

2. The method of claim 1, wherein the controlling the performing the timing measurement and the searching for the available PLMNs comprises:
    putting the searching for available PLMNs on hold and allowing the performing the timing measurement in response to determining that the performing the timing measurement began first and that the mobile device includes no more than one available receive path.

3. The method of claim 1, wherein the controlling the performing the timing measurement and the searching for the available PLMNs comprises:
    suspending the searching for the available PLMNs and allowing the performing the timing measurement in response to determining that the searching for the available PLMNs began first and that the mobile device includes no available receive paths other than a receive path utilized by the searching for the available PLMNs.

4. The method of claim 3, wherein the searching for the available PLMNs comprises searching a plurality of frequency bands associated with a PLMN search, wherein the suspending the searching for the available PLMNs comprises saving a partial result of the PLMN search of at least one frequency band of the plurality of frequency bands.

5. The method of claim 3, wherein the suspending the searching for the available PLMNs and the allowing the performing the timing measurement includes tuning a receiver of the mobile device from one or more frequency bands associated with a PLMN search to one or more frequency bands associated with the one or more positioning signals.

6. The method of claim 3, further comprising resuming the searching for the available PLMNs in response to completing the performing the timing measurement.

7. The method of claim 1, wherein controlling the performing the timing measurement and the searching for the available PLMNs comprises:
    concurrently performing the timing measurement and searching for the available PLMNs in response to determining that the performing the timing measurement began first and that the mobile device includes at least one available receive path other than a receive path utilized by the performing the timing measurement, wherein concurrently performing the timing measurement and searching for the available PLMNs includes performing the timing measurement of the one or more positioning signals received via a first receive path and concurrently searching for the available PLMNs via a second receive path.

8. The method of claim 1, wherein controlling the performing the timing measurement and the searching for the available PLMNs comprises:
    concurrently performing the timing measurement and searching for the available PLMNs in response to determining that the searching for the available PLMNs began first and that the mobile device includes at least one available receive path other than a receive path utilized by the searching for the available PLMNs, wherein concurrently performing the timing measurement and searching for the available PLMNs includes performing the timing measurement of the one or more positioning signals received via a first receive path and concurrently searching for the available PLMNs via a second receive path.

9. The method of claim 1, wherein performing the timing measurement comprises performing the timing measurement in response to receiving assistance data (AD) at the mobile device, wherein the AD identifies the one or more positioning signals with which the mobile device is to perform the timing measurement.

10. The method of claim 1, wherein the performing the timing measurement includes estimating a time difference of arrival (TDOA) of the one or more positioning signals.

11. The method of claim 1, wherein the one or more positioning signals comprise positioning reference signals (PRS).

12. The method of claim 1, wherein the searching for available PLMNs by the mobile device is executed in a PLMN search mode, the PLMN search mode comprising one of an automatic PLMN search or a manual PLMN search.

13. The method of claim 1, wherein controlling the performing the timing measurement and the searching for the available PLMNs comprises:
    determining whether the mobile device is in an Radio Resource Control (RRC) idle mode; and
    prioritizing the performing the timing measurement over the searching for the available PLMNs only if the mobile device is in the RRC idle mode.

14. A mobile device, comprising:
    a processor; and
    a memory coupled to the processor, wherein the processor and the memory are configured to direct the mobile device to:

perform a timing measurement of one or more positioning signals received at the mobile device;
search for available public land mobile networks (PLMNs) by the mobile device; and
control the performing the timing measurement and the searching for the available PLMNs based on whether the performing the timing measurement or the searching for the available PLMNs began first and further based on a number of available receive paths on the mobile device.

15. The mobile device of claim 14, wherein the processor and the memory are further configured to direct the mobile device to:
put the searching for available PLMNs on hold and allow the performing the timing measurement in response to determining that the performing the timing measurement began first and that the mobile device includes no more than one available receive path.

16. The mobile device of claim 14, wherein the processor and the memory are further configured to direct the mobile device to:
suspend the searching for the available PLMNs and allow the performing the timing measurement in response to determining that the searching for the available PLMNs began first and that the mobile device includes no available receive paths other than a receive path utilized by the searching for the available PLMNs.

17. The mobile device of claim 16, wherein the processor and the memory are further configured to direct the mobile device to:
search a plurality of frequency bands associated with a PLMN search, wherein the suspending the searching for the available PLMNs comprises saving a partial result of the PLMN search of at least one frequency band of the plurality of frequency bands.

18. The mobile device of claim 16, wherein directing the mobile device to suspend the searching for the available PLMNs and allow the performing the timing measurement includes tuning a receiver of the mobile device from one or more frequency bands associated with a PLMN search to one or more frequency bands associated with the one or more positioning signals.

19. The mobile device of claim 16, wherein the processor and the memory are further configured to direct the mobile device to:
resume the searching for the available PLMNs in response to completing the performing the timing measurement.

20. The mobile device of claim 14, wherein the processor and the memory are further configured to direct the mobile device to:
concurrently perform the timing measurement and the search for the available PLMNs in response to determining that the performing the timing measurement began first and that the mobile device includes at least one available receive path other than a receive path utilized by the performing the timing measurement, wherein concurrently performing the timing measurement and the searching for the available PLMNs includes performing the timing measurement of the one or more positioning signals received via a first receive path and concurrently searching for the available PLMNs via a second receive path.

21. The mobile device of claim 14, wherein the processor and the memory are further configured to direct the mobile device to:
concurrently perform the timing measurement and the search for the available PLMNs in response to determining that the searching for the available PLMNs began first and that the mobile device includes at least one available receive path other than a receive path utilized by the searching for the available PLMNs, wherein concurrently performing the timing measurement and the searching for the available PLMNs includes performing the timing measurement of the one or more positioning signals received via a first receive path and concurrently searching for the available PLMNs via a second receive path.

22. A mobile device, comprising:
means for performing a timing measurement of one or more positioning signals received at the mobile device;
means for searching for available public land mobile networks (PLMNs) by the mobile device; and
means for controlling the performing the timing measurement and the searching for the available PLMNs based on whether the performing the timing measurement or the searching for the available PLMNs began first and further based on a number of available receive paths on the mobile device.

23. The mobile device of claim 22, wherein the means for controlling the performing the timing measurement and the searching for the available PLMNs comprises:
means for putting the searching for available PLMNs on hold and allowing the performing the timing measurement in response to determining that the performing the timing measurement began first and that the mobile device includes no more than one available receive path.

24. The mobile device of claim 22, wherein the means for controlling the performing the timing measurement and the searching for the available PLMNs comprises:
means for suspending the searching for the available PLMNs and allowing the performing the timing measurement in response to determining that the searching for the available PLMNs began first and that the mobile device includes no available receive paths other than a receive path utilized by the searching for the available PLMNs.

25. The mobile device of claim 24, further comprising means for searching a plurality of frequency bands associated with a PLMN search, wherein the suspending the searching for the available PLMNs comprises saving a partial result of the PLMN search of at least one frequency band of the plurality of frequency bands.

26. The mobile device of claim 24, wherein the means for suspending the searching for the available PLMNs and the allowing the performing the timing measurement includes means for tuning a receiver of the mobile device from one or more frequency bands associated with a PLMN search to one or more frequency bands associated with the one or more positioning signals.

27. The mobile device of claim 24, further comprising means for resuming the searching for the available PLMNs in response to completing the performing the timing measurement.

28. The mobile device of claim 22, wherein the means for controlling the performing the timing measurement and the searching for the available PLMNs comprises:
means for concurrently performing the timing measurement and the searching for the available PLMNs in response to determining that the performing the timing measurement began first and that the mobile device includes at least one available receive path other than a receive path utilized by the performing the timing measurement, wherein the concurrently performing the timing measurement and the searching for the available PLMNs includes performing the timing measurement of the one or more positioning signals received via a first receive path and concurrently searching for the available PLMNs via a second receive path.

29. The mobile device of claim 22, wherein the means for controlling the performing the timing measurement and the searching for the available PLMNs comprises:

means for concurrently performing the timing measurement and the searching for the available PLMNs in response to determining that the searching for the available PLMNs began first and that the mobile device includes at least one available receive path other than a receive path utilized by the searching for the available PLMNs, wherein the concurrently performing the timing measurement and the searching for the available PLMNs includes performing the timing measurement of the one or more positioning signals received via a first receive path and concurrently searching for the available PLMNs via a second receive path.

30. A non-transitory computer-readable storage medium including program code stored thereon, the program code comprising instructions for instructing a mobile device to:

perform a timing measurement of one or more positioning signals received at the mobile device;

search for available public land mobile networks (PLMNs) by the mobile device; and control the performing the timing measurement and the searching for the available PLMNs based on whether the performing the timing measurement or the searching for the available PLMNs began first and further based on a number of available receive paths on the mobile device.

* * * * *